United States Patent Office 3,376,323
Patented Apr. 2, 1968

3,376,323
17α-DIHALOMETHYL STEROIDS AND PROCESS FOR THEIR PREPARATION
John H. Fried, Palo Alto, Calif., assignor to Syntex Corporation, Panama, Panama, a corporation of Panama
No Drawing. Filed Jan. 6, 1966, Ser. No. 518,994
14 Claims. (Cl. 260—397.3)

ABSTRACT OF THE DISCLOSURE

As novel compounds, 17α-dihalomethyl steroids of the pregnane series containing optical substitution and/or unsaturation at one or more of the C–1, 2, C–3, C–6, C–6, 7, C–10, and C–16 positions which compounds are progestational agents and processes for the preparation of such compounds.

---

This invention is directed at novel cyclopentanopolyhydrophenanthrene derivatives and at processes for their preparation. Specifically, this invention is directed at 17α-dihalomethyl pregnenes of the formula:

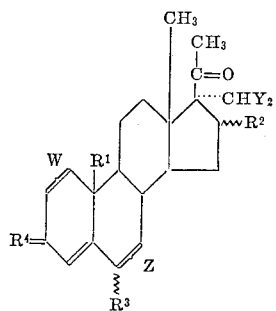

wherein:
$R^1$ is hydrogen or methyl;
$R^2$ is hydrogen or methyl;
$R^3$ is hydrogen, chloro, fluoro or methyl;
$R^4$ is an oxygen atom or the group

in which
$R^5$ is hydrogen, tetrahydropyranyl or a hydrocarbon carboxylic acyl group of less than 12 carbon atoms;
Y is chloro or fluoro;
Z is a carbon-carbon double bond, a carbon-carbon single bond or the methylene group

in which X is hydrogen or fluoro; and
W is a carbon-carbon single bond or the methylene group

in which X′ is hydrogen or fluoro.

The hydrocarbon carboxylic acyl groups in the compounds of the present invention will contain less than 12 carbon atoms and may be of a straight, branched, cyclic or cyclic-aliphatic chain structure. This structure may be saturated, unsaturated or aromatic, and optionally substituted by functional groups such as hydroxy, alkoxy containing up to 5 carbon atoms, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The foregoing compounds are progestational agents and are accordingly useful in the treatment of various menstrual disorders, in the control of fertility, in conjunction with estrogenic substances in hormone deficiency states, and in like conditions in which progestational therapy is indicated. They may be administered in the usual pharmaceutical compositions at dosages appropriate for the condition being treated.

The preparation of these novel derivatives may be accomplished, for example, according to the following general reaction scheme:

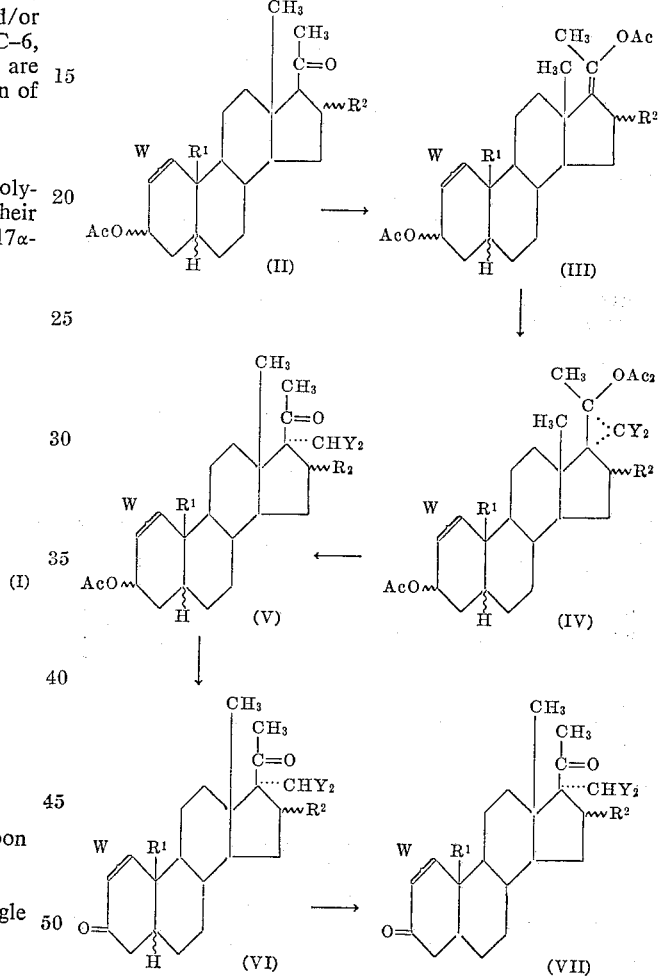

In the foregoing transformation, a 3-acyloxy-20-ketopregnane or a 3-acyloxy-20-keto-19-norpregnane, which may be optionally substituted with a methyl group in the 16α or 16β-position and optionally substituted in the 1α and 2α-positions with a methylene or difluoromethylene group, is treated with acetic anhydride in the presence of an acid catalyst such a p-toluenesulfonic acid. The resultant mixture of isomeric 20-acetoxypregn-17(20)-enes of Formula III is then subjected to the action of a reagent capable of generating a dihalomethylene radical such as, for example, sodium chlorodifluoroacetate or sodium trichloroacetate in refluxing diethyleneglycol dimethyl ether or triethyleneglycol dimethyl ether; a combination of trimethyl(trifluoromethyl)tin, phenyl(trichloromethyl)mercury or phenyl(bromodichloromethyl) mercury and sodium iodide; chloroform in base; and the like. There is thus obtained the corresponding 3-acyloxy-17α,20 - dihalomethylene-20-acetoxypregnane or 19-norpregnane of Formula IV which upon treatment with an acidic agent such as boron trifluoride and hydrogen chloride in glacial acetic acid or perchloric acid in methanol undergoes hydrolytic ring opening to generate a 3-acyloxy-17α-dihalomethyl-20-ketopregnane or 19-norpregnane of Formula V. Hydrolysis of this product, as with potassium bicarbonate in methanol, then yields the corresponding 3-hydroxy derivative which is next oxidized, as with chromic oxide in pyridine, to yield the 3,20-diketo-17α-dihalomethylpregnane or 19-norpregnane of Formula VI. Introduction of a $\Delta^4$ double bond is then accomplished in the conventional manner through α-bromination and subsequent dehydrobromination, as with lithium chloride or calcium carbonate, to yield the 3,20-diketo-17α-dihalomethylpregn-4-ene or 19-norpregn-4-ene of Formula VII. In the case of 5α-pregnanes, the foregoing bromination and dehydrobromination is effected with initial treatment with bromine and sodium iodide followed by treatment with collidine.

Introduction of a 6α-chloro or 6α-fluoro substituent in a 3-keto-$\Delta^4$-ene such as that of Formula VII is accomplished through initial formation of the enol ether, as by the action of ethyl orthoformate and p-toluenesulfonic acid, followed by treatment with N-chlorosuccinimide or perchloryl fluoride respectively, with acid isomerization of any 6β-halo component formed.

A 6-methyl group may either be present in the starting materials employed above or may be introduced via conventional methods at a later stage. Thus, in the latter intsance, a 3,20-diketo-17α-dihalomethyl-$\Delta^4$ compound of Formula VII is first reduced with sodium borohydride to yield the corresponding 3,20-dihydroxy intermediate which is next back-oxidized with dichlorodicyanobenzoquinone or manganese dioxide to form the corresponding 3-keto-20-hydroxy-$\Delta^4$ compound. Conversion of this compound to its enol acetate, as with acetic anhydride ad p-toluenesulfonic acid, followed by reduction with sodium borohydride next furnishes the 3-hydroxy-20-acetoxypregn-5-ene which is reacylated with acetic anhydride in pyridine. The resultant 3,20-diacetoxy-$\Delta^5$-dehydro intermediate is then subjected to the action of monoperphthalic in chloroform to yield the corresponding 3,20-diacetoxy-5α,6α-oxido compound. Treatment of this derivative with methylmagnesium bromide then furnishes the 3,5α20-trihydroxy-6β-methylpregnane which is oxidized, as with chromic trioxide in pyridine, to form the 3,20-diketo-5α-hydroxy-6β-methyl product. Upon subjecting this to the action of methanolic sodium hydroxide, the corresponding 3,20-diketo - 6α - methyl-17α-dihalomethylpregn-4-ene is then obtained.

The 3-keto-$\Delta^{4,6}$-dienes of the present invention, obtained as described above, may in turn be treated with dimethylsulfoxonium methylide in dimethylsulfoxide or with sodium chlorodifluoroacetate (or with other difluoromethylene-forming reagents in the manner described above) to yield the 3-keto-6,7-methylene-$\Delta^4$-ene or 3-keto-6,7-difluoromethylene-$\Delta^4$-ene derivative, respectively.

The 3-keto-$\Delta^4$ derivatives of the present invention may be converted to the corresponding 3β-hydroxy-$\Delta^4$-enes through reduction, as with sodium borohydride, lithium aluminum hydride, or the like, and the resultant 3β-hydroxy derivatives in turn may be esterified as, for example, through the use of acetic anhydride in pyridine, or etherified through the action of dihydropyran and an acid catalyst such as p-toluenesulfonyl chloride, dinitrobenzenesulfonyl chloride, or the like.

The requisite intermediates of Formula II, wherein W is a methylene or difluoromethylene group of the structure defined above, are obtained from the corresponding 3,20-diketo-5α-pregnanes through treatment with bromine in acetic acid to generate the corresponding 2-bromo intermediate, dehydrobromination as with calcium carbonate, and treatment of the resultant 3,20-diketo-5α-pregn-1-ene with dimethylsulfoxonium methylide in dimethylsulfoxide or with sodium chlorodifluoroacetate, as previously described. The 3-keto group may then be selectively reduced to a 3β-hydroxy group with sodium borohydride in ethanol at room temperature, and this 3-hydroxy-20-keto-5α-pregnane with a methylene or difluoromethylene substituent bridging the 1 and 2-position is then esterified as with an acid anhydride in pyridine.

The following examples will serve to further typify the nature of this invention; but being presented solely for the purpose of illustration, they should not be construed as a limitation thereof.

EXAMPLE 1

Approximately 2 ml. of solvent are removed by distillation over a 30-minute period from a mixture of 1.2 g. of 3α-acetoxypregnan-20-one, 20 ml. of acetic anhydride and .06 g. of p-toluenesulfonic acid. The mixture is then refluxed for 24 hours, cooled and diluted with ethyl acetate. The organic solution is then washed with water, aqueous soduim bicarbonate and again with water until neutral, dried over sodium sulfate and evaporated to dryness to yield 3α,20-diacetoxypregn-17-ene which may be recrystallized from methylene chloride:hexane.

To a stirred and refluxing solution of 1 g. of 3α,20-diacetoxypregn-17-ene in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, the mixture is filtered and evaporated in vacuo to dryness. The residue is chromatographed on alumina, eluting with methylene chloride, to yield 3α,20-diacetoxy-17α,20-difluoromethylenepregnane.

A solution of 1 g. of 3α,20-diacetoxy-17α,20-difluoromethylenepregnane in 30 ml. of absolute ethanol and 0.25 ml. of 70% perchloric acid is allowed to stand at 25° C. for 48 hours. At the end of this time, the reaction mixture is diluted with water and filtered. The solid thus collected is chromatographed on Florisil absorbent to yield 3α-aceoxy-17α-difluoromethylpregnan-20-one.

One gram of 3α-acetoxy-17α-difluoromethylpregnan-20-one is allowed to stand at room temperature for 15 hours with 1 g. of potassium bicarbonate in 10 ml. of water and 90 ml. of methanol. At the end of this time, the methanol is evaporated under reduced pressure and the residue is extracted with ethyl acetate and water. Evaporation of the ethyl acetate from these extracts yields 17α-difluoromethyl-20-ketopregnan-3α-ol which is collected by filtration and recrystallized from acetone:hexane.

A solution of 6 g. of 17α-difluoromethyl-20-ketopregnan-3α-ol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 17α-difluoromethylpregnane-3,20-dione which may be further purified by recrystallization from acetone:hexane.

To a stirred solution of 1 g. of 17α-difluoromethylpregnane-3,20-dione in 17 ml. of chloroform and 20 ml. of glacial acetic acid, cooled to −10° C., are added a few drops of a 15% solution of hydrogen bromide in acetic acid followed by a solution of 0.46 g. of bromine in 12 ml. of chloroform, the latter at such a rate that the reaction mixture maintains a pale yellow color. A cold solution of 2.5 g. of sodium acetate in 17 ml. of water is then added. The layers are separated and the aqueous layer is extracted with chloroform. The combined extracts and organic layer are washed with water, dilute potassium bicarbonate solution and with water, dried over sodium sulfate and evaporated to dryness to yield the 4-bromo intermediate, 1 g. of which is dissolved in 20 ml. of dimethylformamide containing 0.5 g. of lithium chloride. This solution is stirred under nitrogen at steam bath temperatures for four hours. After cooling to 10° C., 11 ml. of water are added with stirring at such a rate that the temperature is maintained below 30° C. Stirring in an ice bath is continued until solid forms, and this material is then collected by filtration, washed with cold 1:1 water: dimethylformamide and then water and dried to yield 17α-difluoromethylpregn-4-ene-3,20-dione which is further purified through recrystallization from acetone with charcoal decolorization as necessary.

In a similar fashion, 3α-acetoxy-19-norpregnan-20-one is substituted for 3β-acetoxypregnan-20-one. There is thus obtained upon execution of the steps herein described, 17α-difluoromethyl-19-norpregn-4-ene-3,20-dione.

EXAMPLE 2

(a) 1α,2α-methylene-3β-acetoxy-5α-pregnan-20-one is treated with acetic anhydride and p-toluenesulfonic acid in the manner of Example 1 to yield 1α,2α-methylene-3β,20-diacetoxy-5α-pregn-17-ene.

To a stirred and refluxing solution of 1 g. of 1α,2α-methylene-3β,20-diacetoxy-5αpregn-17-ene in 10 ml. of dimethyl triethyleneglycol ether, are added in a dropwise fashion and under nitrogen, 30 equivalents of a 50% w./v. solution of sodium trichloroacetate. The solution is then cooled and filtered and the filtrate is evaporated to dryness under reduced pressure. The residue thus obtained is chromatographed on alumina, eluting with methylene chloride, to yied 1α,2α-methylene-3β,20-diacetoxy-17α,20-dichloromethylene-5α-pregnane.

A solution of 1 g. of 1α,2α-methylene-3β,20-diacetoxy-17α,20-dichloromethylene-5α-pregnane in 30 ml. of absolute ethanol and 0.25 ml. of 70% perchloric acid is allowed to stand at 25° C. for 48 hours. At the end of this time, the mixture is diluted with water and filtered. Upon chromatography on Florisil absorbent there is obtained 1α,2α-methylene-3β-acetoxy-17α - dichloromethyl - 5α-pregnan-20-one.

Likewise, by subjecting 1α,2α-difluoromethylene-3β-acetoxy-5α-pregnan-20-one; 3β-acetoxy - 16α-methyl-5α-pregnan-20-one; 3β-acetoxy-16β-methyl-5α-pregnan - 20-one; and 3β-acetoxy-5α-pregnan-20-one to the foregoing procedures, there are respectively obtained 1α,2α-difluoromethylene - 3β - acetoxy - 17α-dichloromethyl-5α-pregnan-20-one; 3β - acetoxy - 16α-methyl-17α-dichloromethyl-5α-pregnan-20 - one; 3β-acetoxy-16β-methyl-17α-dichloromethyl-5α-pregnan-20-one; and 3β-acetoxy-17α-dichloromethly-5α-pregnan-20-one.

If, in place of sodium trichloroacetate, one employs sodium cholordifluoroacetate in the manner described in Example 1, there are respectively obtained for the five foregoing starting materials, 1α,2α-methylene-3β-acetoxy-17α-difluoromethly-5α-pregnan-20-one; 1α,2α - difluoromethylene-3β-acetoxy-17α-difluoromethyl-5α-pregnan - 20-one; 3β - acetoxy - 16α - methyl-17α-difluoromethly-5α-pregnan - 20 - one; 3β-acetoxy-16β-methly-17α-difluoromethly-5α-pregnan-20-one; and 3β-acetoxy-17α-difluoromethyl-5α-pregnan-20-one.

The above starting material, 1α,2α-methylene-3β-acetoxy-5α-pregnan-20-one, may be obtained in the following manner.

To a stirred solution of 1 g. of 5α-pregnane-3,20-dione and 6.6 of p-toluenesulfonic acid in 330 ml. of glacial acetic acid is added, over a 10-minute period, a solution of 1.1 molar equivalent of bromine and 2.45 g. of sodium acetate in 110 ml. of glacial acetic acid. After stirring for an additional 10-minute period, a solution of 75 g. of sodium acetate in 150 ml. of glacial acetic acid is added and stirring is then continued at 20° C. for five minutes. The reaction mixture is next poured into 1 liter of ice water and the solid which forms is collected and dissolved in methylene chloride. This solution is washed with water, dilute sodium bicarbonate solution and water, dried and evaporated to dryness. The residue is dissolved in 60 ml. of dimethylformamide and added to a well stirred suspension of 12.5 g. of calcium carbonate in 440 ml. of dimethylacetamide, heated at reflux. Refluxing is continued for 45 minutes and the mixture is then filtered and concentrated to about 60 ml. under reduced pressure. After the addition of 5 ml. of hexane, the mixture is filtered and the filtrate is evaporated to dryness. This residue is chromatographed on acid-washed alumina with 3:1 benzene-chloroform to yield 5α-pregn-1-ene-3,20-dione which may be recrystallized from cyclohexane: ethyl acetate.

A solution of 0.5 g. of 5α-pregn-1-ene-3,20-dione in 5 ml. of dimethylsulfoxide is added to a solution of one equivalent of dimethylsulfoxonium methylide in dimethylsulfoxide, prepared in the manner of Corey et al., J. Am. Chem. Soc., 87, 1353 (1965). The mixture is stirred under nitrogen at room temperature for 20 hours and then at 50° C. for seven hours. Fifty milliliters of water are then added, and the resulting mixture is extracted four times with 50 ml. of ethyl acetate. The combined extracts are washed with water and saturated aqueous sodium chloride solution, dried over sodium sulfate and evaporated to dryness. This residue is then chromatographed on silica, eluting with ether:methylene chloride to yield 1α,2α-methylene-5α-pregnane-3,20-dione.

A solution of 1 g. of 1α,2α-methylene-5α-pregnane-3,20-dione and 0.1 g. of sodium borohydride in 85 ml. of ethanol is allowed to stand at room temperature for one hour. The excess reagent is then destroyed with acetic acid and the solution is concentrated under reduced pressure and diluted with water. The solid thus formed is collected by filtration and dried to yield 1α,2α-methylene-3β-hydroxy-5α-pregnan-20-one. This material is dissolved in pyridine and treated with 1 ml. of acetic acid. The resultant mixture is heated at steam bath tempeartures for one hour and then diluted with water to yield 1α,2α-methylene-3β-acetoxy-5α-pregnan-20-one.

By subjecting 5α-pregn-1-ene-3,20-dione to the action of sodium chlorodifluoroacetate as described in Example 1, there is obtained 1α,2α-difluoromethylene-5α-pregnane-3,20-dione which is converted to 1α,2α-difluoromethylene-3β-acetoxy-5α-pregnan-20-one via sodium borohydride reduction and acetylation in the fashion described above.

(b) 1α,2α - methylene - 3β - acetoxy - 17α - dichloromethyl-5α-pregnan-20-one is hydrolyzed with potassium bicarbonate in methanol as described in Example 1 to yield 1α,2α - methylene - 3β - hydroxy - 17α - dichloromethyl-5α-pregnan-20-one, and this product is then oxidized with chromic trioxide in pyridine, also as described in Example 1, to yield 1α,2α-methylene-17α-dichloromethyl-5α-pregnane-3,20-dione. Upon bromination and dehydrobromination as described in Example 1, there is then obtained 1α,2α-methylene-17α-dichloromethylpregn-4-ene-3,20-dione. In a similar fashion are obtained 1α,2α-methylene - 17α - difluoromethylpregn - 4 - ene - 3,20-dione; 1α,2α - difluoromethylene - 17α - dichloromethyl-pregn-4-ene-3,20-dione; and 1α,2α-difluoromethylene-17α-difluoromethylpregn-4-ene-3,20-dione.

In the case of the 5α-pregnanes which are unsubstituted in the 2-position, the following procedure is employed for introduction of the Δ⁴ double bond (after hydrolysis of the 3β-actoxy group and oxidation of the resultant 3β-hydroxy group in the manner described in Example 1).

Two equivalents of bromine in 15 ml. of glacial acetic acid are added dropwise to a soltuion of 1 g. of 16β-methyl - 17α - difluoromethyl - 5α - pregnane - 3,20 - dione in 25 ml. of acetic acid containing a few drops of 4 N hydrogen bromide in acetic acid. After being allowed to stand for five hours at room temperature, the mixture is poured into ice water and the solid which forms is collected by filtration, washed well with water and dried. This material is then refluxed for 14 hours with 2 g. of sodium iodide in 40 ml. of 2-butanone, allowed to stand at room temperature for 12 hours, diluted with water, and extracted with ether. These extracts are washed with sodium thiosulfate solution and water and are evaporated under reduced pressure. The residue is combined with 10 ml. of collidine and refluxed for 30 minutes. The cooled solution is filtered and the filtrate is diluted with ether, washed with dilute hydrochloric acid, aqueous sodium bicarbonate solution and water. The dried organic phase is evaporated to yield 16β-methyl-17α-difluoromethylpregn-4-ene-3,20-dione which is recrystallized from ether:hexane.

In a similar fashion there is obtained from the corresponding 5α-pregnanes, 16β-methyl-17α-dichloromethylpregn-4-ene-3,20-dione; 16α-methyl-17α-dichloromethylpregn-4-ene-3,20-dione; 16α-methyl-17α-difluoromethylpregn-4-ene-3,20-dione; 17α-dichloromethylpregn-4-ene-3,20-dione; and 17α-difluoromethylpregn-4-ene-3,20-dione, the last named compound being identical to that prepared in Example 1.

EXAMPLE 3

To a suspension of 1 g. of 17α-difluoromethylpregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-17α-difluoromethylpregn-3,5-dien-20-one which is recrystallized from acetone:hexane.

A mixture of 5 g. of 3-ethoxy-17α-difluoromethylpregna-3,5-dien-20-one, 2 g. of anhydrous sodium acetate and 100 ml. of acetone is treated with 32 ml. of water. The solution is cooled at 5° C. and 1.1 molar equivalents of N-chlorosuccinimide and 2 ml. of glacial acetic acid are added. The mixture is stirred for 30 minutes at the same temperature and then diluted with water. After being allowed to stand at 0° C. for 15 hours, the solid is collected by filtration, washed with water and dried under vacuum to yield 6β-chloro-17α-difluoromethylpregn-4-ene-3,20-dione which is recrystallized from acetone. The corresponding 6α-chloro compound is obtained by dissolving this compound in glacial acetic acid and introducing a slow stream of anhydrous hydrogen chloride over a period of four hours and at a temperature of 15° C. The solid which forms upon pouring this mixture into water is collected by filtration, washed with water and dried to yield 6α-chloro-17α-difluoromethylpregn-4-ene-3,20-dione which is recrystallized from acetone:hexane.

6α - chloro - 16α - methyl - 17α - difluoromethylpregn-4 - ene - 3,20 - dione; 6α - chloro - 16β - methyl - 17α-difluoromethylpregn - 4 - ene - 3,20 - dione; 1α,2α - methylene -6α - chloro - 17α - difluoromethylpregn - 4 - ene-3,20 - dione; and 1α,2α - difluoromethylene - 6α - chloro-17α-difluoromethylpregn-4-ene-3,20-dione are obtained in the same manner from the corresponding starting materials.

EXAMPLE 4

A stream of perchloryl fluoride is passed through a solution of 1 g. of 3-ethoxy-17α-difluoromethylpregna-3,5-dien-20-one in 25 ml. of dimethylformamide, cooled to 0° C., for five minutes. After being allowed to slowly attain a temperature of 20° C., the solution is poured into water and extracted with ethyl acetate. These extracts are washed with saturated aqueous sodium bicarbonate solution and with water to neutrality, dried over sodium sulfate and evaporated to dryness. The residue is then chromatographed on alumina to separate the 6α-fluoro and 6β-fluoro isomers. The latter, which predominates, is dissolved in 50 ml. of glacial acetic acid, and through this solution is passed a stream of dry hydrogen chloride for a period of 24 hours and at a temperature of 15° C. The mixture is poured into cold water and the solid which forms is collected by filtration, washed with water and dried to yield 6α-fluoro-17α-difluoromethylpregn-4-ene-3,20-dione which is recrystallized from acetone:hexane.

Other 6α-fluoro derivatives of the present invention are prepared via this procedure.

EXAMPLE 5

A suspension of 0.5 g. of 5% palladium-on-charcoal catalyst in 50 ml. of methanol is hydrogenated for 30 minutes. At the end of this time a solution of 2 g. of 6α-methyl-20,20-ethylenedioxypregn-4-en - 3 - one and 0.5 g. of sodium hydroxide in 200 ml. of methanol is added and hydrogenated with agitation until the uptake of hydrogen has ceased. The catalyst is then removed by filtration and washed with methanol, and the combined filtrate and washings are then poured into ice water to yield 6α-methyl-20,20-ethyleneketal-5β-pregnan-3-one.

A solution of 1 g. of sodium borohydride in 3 ml. of water is added to an ice-cooled solution of 1 g. of 6α-methyl-20,20-ethyleneketal-5β-pregnan-3-one in 120 ml. of methanol, and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 6α - methyl - 20,20 - ethylenedioxy-5β-pregnan-3α-ol which may be further purified by recrystallization from acetone:hexane.

A mixture of 1 g. of 6α-methyl-20,20-ethylenedioxy-5β-pregnan-3α-ol, 4 ml. or pyridine and 2 ml. of acetic anhydride is allowed to stand at room temperature for 15 hours. The mixture is then poured into ice water and the solid which forms is collected by filtration, washed with water and dried to yield 3α - acetoxy-6α-methyl-20,20-ethylenedioxy-5β-pregnane which may be further purified through recrystallization from acetone:hexane.

A mixture of 0.5 g. of 3α-acetoxy-6α-methyl-20,20-ethylenedioxy-5β-pregnane in 30 ml. of acetone and 50 mg. of p-toluenesulfonic acid is allowed to stand at room temperature for 15 hours. It is then poured into ice water and extracted with ethyl acetate. These extracts are washed with water to neutrality, dried over sodium sulfate and evaporated to dryness. The residue is triturated with ether to yield 3α - acetoxy-6α-methyl-5β-pregnan-20-one which is recrystallized from acetone:hexane. Upon subjecting this compound to the procedure of Example 1, there is obtained 6α-methyl-17α-difluoromethylpregn-4-ene-3,20-dione.

Alternatively, the 6α-methyl group may be introduced in the compounds of the present invention via the following procedure.

A solution of 1 g. of sodium borohydride in 3 ml. of water is added to an ice-cooled solution of 1 g. of 1α,2α-methylene-17α-difluoromethylpregn-4-ene-3,20 - dione in 120 ml. of methanol, and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 1α,2α-methylene-17α-difluoromethylpregn-4-ene-3β,20-diol which may be further purified by recrystallization from acetone:hexane.

One gram of 1α,2α-methylene-17α-difluoromethylpregn-4-ene-3β,20-diol in 100 ml. of chloroform which has been distilled over calcium chloride is stirred for 18 hours at room temperature with 10 g. of freshly precipitated manganese dioxide. The inorganic material is then removed by filtration and washed with hot chloroform and the combined filtrate and washings are evaporated to yield 1α,2α-methylene-17α - difluoromethyl-20-hydroxypregn-4-en-3-one which may be further purified through recrystallization from acetone:hexane.

A solution of 5 g. of 1α,2α-methylene-17α-difluoromethyl-20-hydroxypregn-4-en-3-one in 50 ml. of acetic anhydride and 50 ml. of acetyl chloride is heated at reflux for four hours under nitrogen. The reaction mixture is then distilled to almost dryness, cooled and diluted with ether. The organic phase is washed with water, aqueous 5% sodium bicarbonate solution and again with water, dried over sodium sulfate and evaporated to yield 1α,2α-methylene-3,20-diacetoxy-17α - difluoromethylpregn - 3,5-diene which may be recrystallized from acetone:hexane.

A solution of 2 g. of sodium borohydride in 30 ml. of methanol is added with stirring to a solution of 2 g. of 1α,2α-methylene - 3,20 - diacetoxy - 17α - difluoromethylpregna-3,5-diene in 40 ml. of tetrahydrofuran. The mixture is allowed to stand at room temperature for 15 hours and the excess reagent is then decomposed by the addition of acetic acid. The mixture is next concentrated to small volume under reduced pressure, diluted with water and extracted with ethyl acetate. These extracts are washed with water, dried and evaporated to yield 1α,2α-methylene-17α-difluoromethyl-20 - acetoxypregn - 5 - en-3β-ol which is further purified through recrystallization from acetone:hexane.

A mixture of 1 g. of 1α,2α-methylene-17α-difluoromethyl-20-acetoxypregn-5-en-3β-ol, 4 ml. of pyridine and 2 ml. of acetic anhydride is allowed to stand at room temperature for 15 hours. The mixture is then poured into ice water and the solid which forms is collected by filtration, washed with water and dried to yield 1α,2α-methylene - 3β,20 - diacetoxy - 17α - difluoromethylpregn - 5-ene which may be further purified through recrystallization from acetone:hexane.

A solution of 2.5 g. of 1α,2α-methylene-3β,20-diacetoxy-17α-difluoromethylpregn-5-ene in 100 ml. of chloroform is cooled to 0° C. and mixed with a solution of 1.1 molar equivalents of monoperphthalic acid in ether. The mixture is allowed to stand at room temperature for 20 hours and is then diluted with water. The organic layer is separated, washed with aqueous sodium bicarbonate solution and then with water to neutrality, dried over sodium sulfate and evaporated to dryness to yield 1α,2α-methylene-3β,20-diacetoxy - 5α,6α - oxido - 17α - difluoromethyl - 5α - pregnane which may be further purified by recrystallization from acetone:hexane.

To a stirred solution of 20 ml. of 4 N methylmagnesium bromide in ether is added a solution of 1 g. of 1α,2α-methylene - 3β,20 - diacetoxy - 5α,6α - oxido - 17α - difluoromethyl-5α-pregnane in 30 ml. of dry tetrahydrofuran, and the stirred mixture is heated at reflux temperatures for 30 minutes. The reflux condenser is then replaced by a calcium chloride drying tube and the ether is allowed to escape. When the internal temperature is 54° C., the condenser is returned and the mixture refluxed for an additional four-hour period. Two hundred milliliters of a saturated ammonium chloride solution are then slowly added to the cooled mixture which is then stirred for 15 minutes and extracted with ethyl acetate. These extracts are washed with water, dried over sodium sulfate and evaporated to dryness to yield 1α,2α-methylene-6β-methyl-17α-difluoromethyl-5α-pregnane-3β,5α,20-triol which is recrystallized from aqueous methanol.

A solution of 6 g. of 1α,2α-methylene-6β-methyl-17α-difluoromethyl-5α-pregnane-3β,5α,20-triol in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 1α,2α-methylene-5α-hydroxy - 6β - methyl - 17α - difluoromethyl - 5α - pregnane - 3,20-dione which may be further purified by recrystallization from acetone:hexane.

A solution of 1 g. of 1α,2α-methylene-5α-hydroxy-6β-methyl-17α-difluoromethyl-5α-pregnane-3,20-dione in 100 ml. of methanol and 50 ml. of 1 N aqueous sodium hydroxide is allowed to stand at room temperature under nitrogen for 24 hours. The solution is then concentrated under reduced pressure and without heating to half its volume and diluted with ice water. The solid which forms is collected by filtration, washed with water and dried to yield 1α,2α-methylene-6α-methyl-17α-difluoromethyl-pregn-4-ene-3,20-dione which may be further purified through recrystallization from acetone:hexane.

EXAMPLE 6

To a suspension of 1 g. of 6α-chloro-17α-difluoromethyl-pregn-4-ene-3,20-dione in 7.5 ml. of anhydrous, peroxide-free dioxane are added 1.2 ml. of freshly distilled ethyl orthoformate and 0.8 g. of p-toluenesulfonic acid. The mixture is stirred at room temperature for 15 minutes and allowed to stand at room temperature for 30 minutes. There is then added 0.8 ml. of pyridine, followed by water until solidification occurs. This solid is collected by filtration, washed with water and air dried to yield 3-ethoxy-6-chloro-17α-difluoromethylpregna-3,5-dien-20-one which is recrystallized from acetone:hexane.

To a solution of 1 g. of 3-ethoxy-6-chloro-17α-difluoromethylpregna-3,5-dien-20-one in 20 ml. of tetrahydrofuran, cooled to 0° C., is added 1.05 molar equivalents of 2,3-dichloro-5,6-dicyano-1,4-benzoquinone and 100 mg. of p-toluenesulfonic acid. The resulting mixture is stirred at 0° C. for 30 minutes, filtered, and diluted with 100 ml. of methylene chloride. The organic phase is separated, washed with 5% aqueous sodium hydroxide solution until the washings are colorless and then with water to neutrality, dried over sodium sulfate and evaporated to dryness to yield 6-chloro-17α-difluoromethylpregna-4,6-diene-3,20-dione which may be further purified through recrystallization from acetone:hexane.

In a similar fashion, the following compounds are obtained via the foregoing procedure:

6-fluoro-17α-difluoromethylpregna-4,6-diene-30-dione;
6-methyl-17α-difluoromethylpregna-4,6-diene-3,20-dione;
17α-difluoromethylpregna-4,6-diene-3,20-dione;
16α-methyl-17α-difluoromethylpregna-4,6-diene-3,20-dione;
16β-methyl-17α-difluoromethylpregna-4,6-diene-3,20-dione;
1α,2α-methylene-6-chloro-17α-difluoromethylpregna-4,6-diene-3,20-dione;
6-chloro-16α-methyl-17α-difluoromethylpregna-4,6-diene-3,20-dione;
6-chloro-16β-methyl-17α-difluoromethylpregna-4,6-diene-3,20-dione;
1α,2α-difluoromethylene-6-chloro-17α-difluoromethylpregna-4,6-diene-3,20-dione;
1α,2α-methylene-6-methyl-17α-difluoromethylpregna-4,6-diene-3,20-dione; and
1α,2α-methylene-17α-difluoromethylpregna-4,6-diene-3,20-dione.

EXAMPLE 7

To a stirred and refluxing solution of 1 g. of 17α-difluoromethylpregna-4,6-diene-3,20-dione in 8 ml. of dimethyl diethyleneglycol ether is added in a dropwise fashion over a two-hour period, a solution of 30 equivalents of sodium chlorodifluoroacetate in 30 ml. of dimethyl diethyleneglycol ether. At the end of the reaction period, which may be followed by the U.V. spectra, the mixture is filtered and evaporated in vacuo to dryness. The residue is added to 10% methanolic potassium hydroxide and this mixture is heated briefly at reflux and poured into ice water. The solid which forms is collected, washed with water, dried and chromatographed on alumina, eluting with methylene chloride, to yield 6α,7α-difluoromethylene-17α-difluoromethylpregn-4-ene-3,20-dione.

In a similar fashion 1α,2α-methylene-17α-difluoromethylpregna-4,6-diene-3,20-dione is subjected to the procedure of this example to yield 1α,2α-methylene-6α,7α-difluoromethylene-17α-difluoromethylpregn-4-ene-3,20 - dione.

EXAMPLE 8

A solution of 1 g. of sodium borohydride in 3 ml. of water is added to an ice-cooled solution of 1 g. of 17α-difluoromethylpregna-4,6-diene - 3,20 - dione in 120 ml. of methanol and the mixture is then allowed to stand for 16 hours at room temperature. The excess reagent is decomposed by addition of acetic acid and the solution is then concentrated to small volume in vacuo and diluted with water. The product is extracted with ethyl acetate and these extracts are washed with water, dried and evaporated to yield 17α-difluoromethylpregna-4,6-diene-3,20-diol which may be further purified by recrystallization from acetone:hexane.

One gram of 17α-difluoromethylpregna-4,6-diene-3,20-diol in 100 ml. of chloroform which has been distilled over calcium chloride, is stirred for 18 hours at room temperature with 10 g. of freshly precipitated manganese dioxide. The inorganic material is then removed by filtration and washed with hot chloroform and the combined filtrate and washings are evaporated to yield 17α-difluoromethyl-20-hydroxypregna-4,6-dien-3-one which may be further purified through recrystallization from acetone:hexane.

A solution of 0.5 g. of 17α-difluoromethyl-20-hydroxypregna-4,6-dien-3-one in 5 ml. of dimethylsulfoxide is added to a solution of one equivalent of dimethylsulfoxonium methylide in dimethylsulfoxide, prepared as described in Example 2. The mixture is stirred under nitrogen at room temperature for 20 hours and then at 50° C. for seven hours. Fifty milliliters of water are then added and the resulting mixture is extracted four times with 50 ml. of ethyl acetate. The combined extracts are washed with $H_2O$ and saturated with aqueous sodium chloride solution, dried over sodium sulfate and evaporated to dryness. This residue is then chromatographed on silica, eluting with ether:methylene chloride to yield 6α,7α-methylene-17α-difluoromethyl-20-hydroxy-pregn-4-en-3-one.

A solution of 6 g. of 6α,7α-methylene-17α-difluoromethylene-20-hydroxypregn-4-en-3-one in 120 ml. of pyridine is added to a mixture of 6 g. of chromic trioxide in 20 ml. of pyridine. The reaction mixture is allowed to stand at room temperature for 15 hours, diluted with ethyl acetate and filtered through Celite diatomaceous earth. The filtrate is washed well with water, dried and evaporated to dryness to yield 6α,7α-methylene-17α-difluoromethylpregn-4-ene-3,20-dione which may be further purified by recrystallization from acetone:hexane.

EXAMPLE 9

A solution of 1 g. of 17α-difluoromethylpregn-4-ene-3,20-dione in 50 ml. of tetrahydrofuran is added over a 30-minute period to a stirred suspension of 1 g. of lithium aluminum hydride in 50 ml. of anhydrous tetrahydrofuran, and this mixture is heated at reflux for two hours. To the mixture are cautiously added 5 ml. of ethyl acetate and 2 ml. of water. Sodium sulfate is next added, the mixture is filtered and the solid thus collected is washed with hot ethyl acetate. The combined organic solutions are then evaporated to yield 3β-hydroxy-17α-difluoromethylpregn-4-en-20-one which may be further purified through recrystallization from acetone:hexane.

In a similar fashion, the other 3-keto-Δ⁴-enes of the present invention are converted to the corresponding 3β-hydroxy-Δ⁴-enes by utilization of the procedure of this example.

EXAMPLE 10

A mixture of 1 g. of 3β-hydroxy-17α-difluoromethyl-pregn-4-en-20-one, 4 ml. of pyridine and 2 ml. of acetic anhydride is allowed to stand at room temperature for 15 hours. The mixture is then poured into ice water and the solid which forms is collected by filtration, washed with water and dried to yield 3β-acetoxy-17α-difluoromethyl-pregn-4-en-20-one which may be further purified through recrystallization from acetone:hexane.

Likewise, the various 3β-hydroxy-Δ⁴-enes of the present invention, prepared according to the procedure of Example 9, may be esterified via the procedure of this example. Utilization of other anhydrides in this method, such as propionic anhydride, yields the corresponding 3β-acylates.

EXAMPLE 11

Two milliliters of dihydropyran are added to a solution of 1 g. of 3β-hydroxy-17α-difluoromethylpregn-4-en-20-one in 15 ml. of benzene. About 1 ml. is removed by distillation to remove moisture and 0.4 g. of p-toluenesulfonic acid is added to the cooled solution. This mixture is allowed to stand at room temperature for four days and is then washed with aqueous sodium carbonate solution and water, dried and evaporated. The residue is chromatographed on neutral alumina, eluting with hexane, to yield 3β-tetrahydropyranyloxy-17α-difluoromethylpregn-4-en-20-one which is recrystallized from pentane.

By employing the various 3β-hydroxy compounds of the present invention in the foregoing procedure, the corresponding 3β-tetrahydropyranyl ethers are obtained.

What is claimed is:

1. Compounds of the formula:

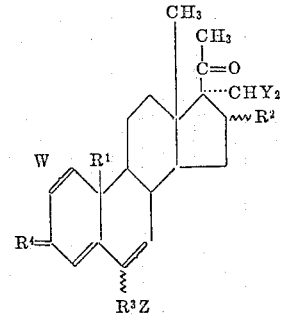

wherein:

$R^1$ is hydrogen or methyl;
$R^2$ is hydrogen or methyl;
$R^3$ is hydrogen, chloro, fluoro or methyl;
$R^4$ is an oxygen atom or the group $$R^5O-\overset{H}{\underset{}{\vdots}}$$

in which
$R^5$ is hydrogen, tetrahydropyranyl, or a hydrocarbon carboxylic acyl group of less than 12 carbon atoms;
Y is chloro or fluoro;
Z is a carbon-carbon double bond, a carbon-carbon single bond or the methylene group $$\overset{\cdot\cdot}{\underset{\cdot}{C}}X_2$$

in which X is hydrogen or fluoro; and
W is a carbon-carbon single bond or the methylene group $$\overset{\cdot\cdot}{\underset{\cdot}{C}}X_2$$

in which X' s hydrogen or fluoro.

2. Compounds according to claim 1 wherein
$R^1$ is methyl;
$R^4$ is an oxygen atom;
W is a carbon-carbon single bond;
Y is fluoro; and
$R^2$, $R^3$ and Z are as therein defined.

3. The compound according to claim 2 wherein
$R^2$ is hydrogen;
$R^3$ is hydrogen; and
Z is a carbon-carbon single bond.

4. The compound according to claim 2 wherein
$R^2$ is hydrogen;
$R^3$ is chloro; and
Z is a carbon-carbon double bond.

5. The compound according to claim 2 wherein
$R^2$ is hydrogen;

$R^3$ is methyl; and
Z is a carbon-carbon double bond.
6. The compound according to claim 2 wherein
$R^2$ is hydrogen;
$R^3$ is methyl; and
Z is a carbon-carbon single bond.
7. The compound according to claim 2 wherein
$R^2$ is hydrogen;
$R^3$ is hydrogen; and
Z is the group $$\diagdown CF_2 \diagup$$

8. Compounds according to claim 1 wherein
$R^1$ is methyl;
$R^4$ is an oxygen atom;
W is the group $$\diagdown CH_2 \diagup$$

Y is fluoro; and
$R^2$, $R^3$ and Z are as therein defined.
9. The compound according to claim 8 wherein
$R^2$ is hydrogen;
$R^3$ is hydrogen; and
Z is a carbon-carbon single bond.
10. The compound according to claim 8 wherein
$R^2$ is hydrogen;
$R^3$ is chloro; and
Z is a carbon-carbon double bond.

11. The compound according to claim 8 wherein
$R^2$ is hydrogen;
$R^3$ is methyl; and
Z is a carbon-carbon double bond.
12. The compound according to claim 8 wherein
$R^2$ is hydrogen;
$R^3$ is hydrogen; and
Z is the group $$\diagdown CF_2 \diagup$$

13. The compound according to claim 8 wherein
$R^2$ is hydrogen;
$R^3$ is methyl; and
Z is a carbon-carbon single bond.
14. The compound according to claim 1 wherein
$R^1$ is methyl;
$R^2$ is hydrogen;
$R^3$ is chloro;
$R^4$ is an oxygen atom;
Y is fluoro;
Z is a carbon-carbon double bond; and
W is a carbon-carbon double bond.

References Cited

UNITED STATES PATENTS 3,314,854   4/1967   Heider et al. _____ 167—65

ELBERT L. ROBERTS, *Primary Examiner.*

UNITED STATES PATENT OFFICE
CERTIFICATE OF CORRECTION

Patent No. 3,376,323

April 2, 1968

John H. Fried

It is hereby certified that error appears in the above numbered patent requiring correction and that the said Letters Patent should read as corrected below.

Column 3, line 35, "ad" should read -- and --; line 45, cancel "subjecting this". Column 5, line 27, "yied" should read -- yield --; line 46, "dichloromethly" should read -- dichloromethyl --; lines 51 and 53, "difluoromethly" should read -- difluoromethyl --; lines 54 and 55, "methly" should read -- methyl --; line 61, after "6.6" insert -- g. --. Column 8, line 25, "or" should read -- of --. Column 11, line 36, "methylene-20" should read -- methyl-20 --. Column 12, lines 28 to 34, the left-hand portion of the formula should appear as shown below:

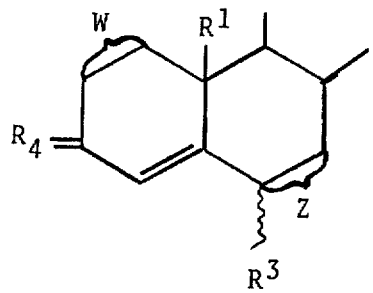

lines 56 to 58, the formula should appear as shown below:

line 59, "s" should read -- is --.

Signed and sealed this 23rd day of September 1969.

(SEAL)
Attest:

EDWARD M. FLETCHER, JR.
Attesting Officer

WILLIAM E. SCHUYLER, JR.
Commissioner of Patents